Jan. 2, 1962 G. SLAYTER ET AL 3,015,524
INVERTED TURBINE
Filed Nov. 19, 1958 4 Sheets-Sheet 2
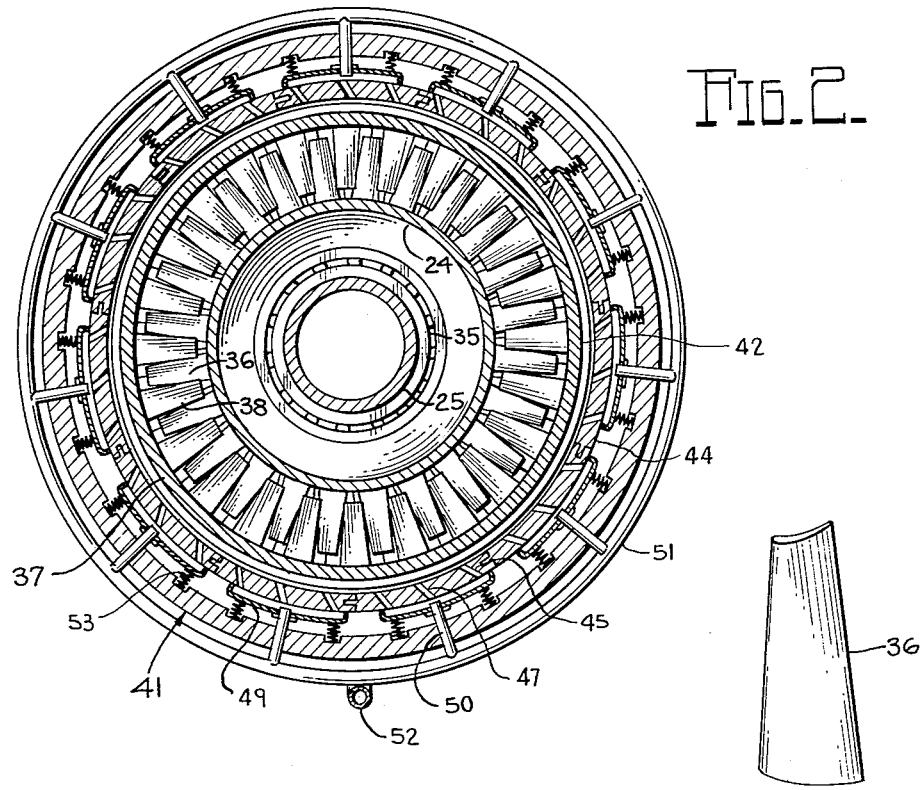
FIG.2.
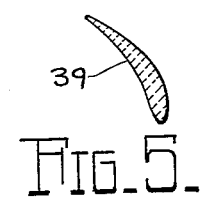
FIG.3.
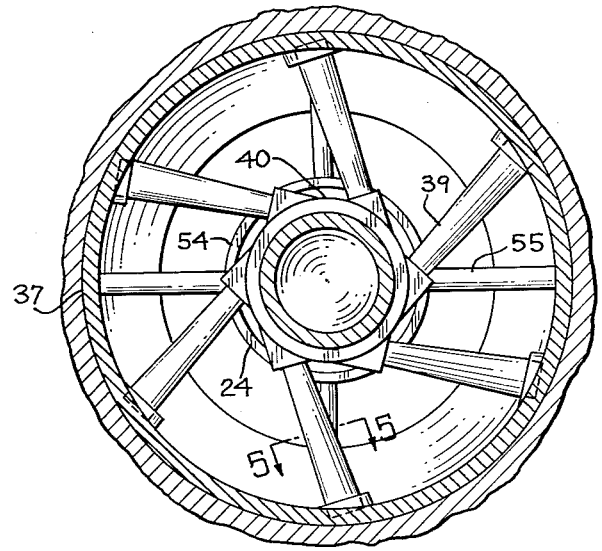
FIG.4.
FIG.5.
INVENTORS
GAMES SLAYTER
BY ARTHUR A. FOWLE
ATTORNEYS Jan. 2, 1962  G. SLAYTER ETAL  3,015,524
INVERTED TURBINE
Filed Nov. 19, 1958  4 Sheets-Sheet 3
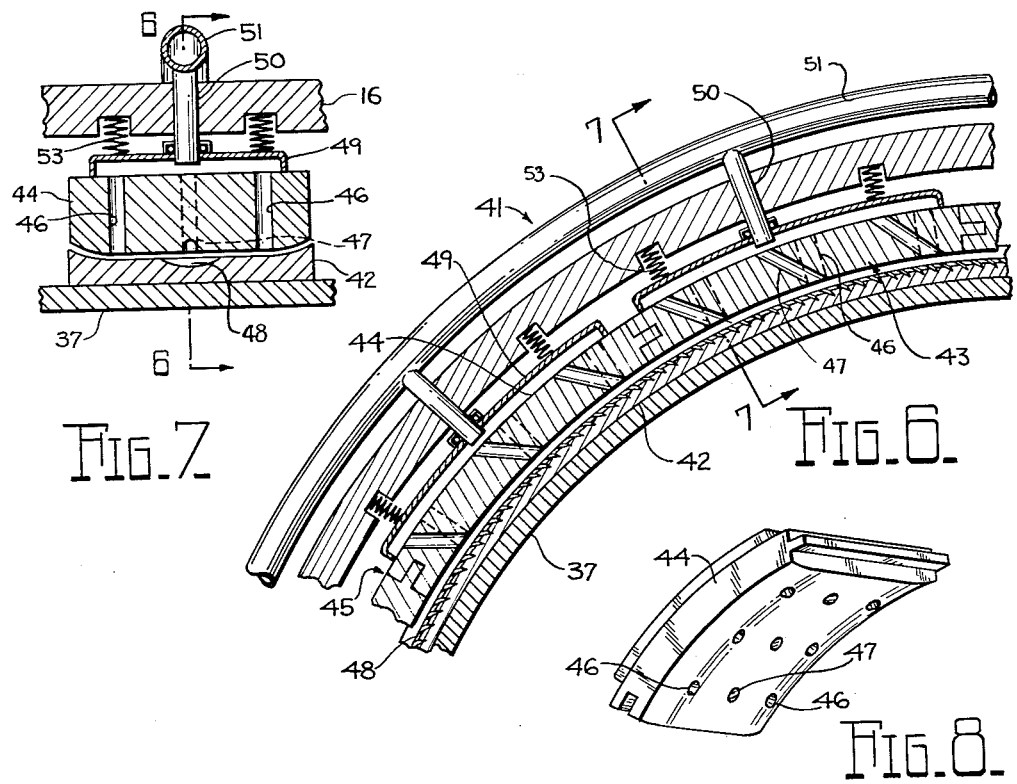
FIG. 7
FIG. 6
FIG. 8
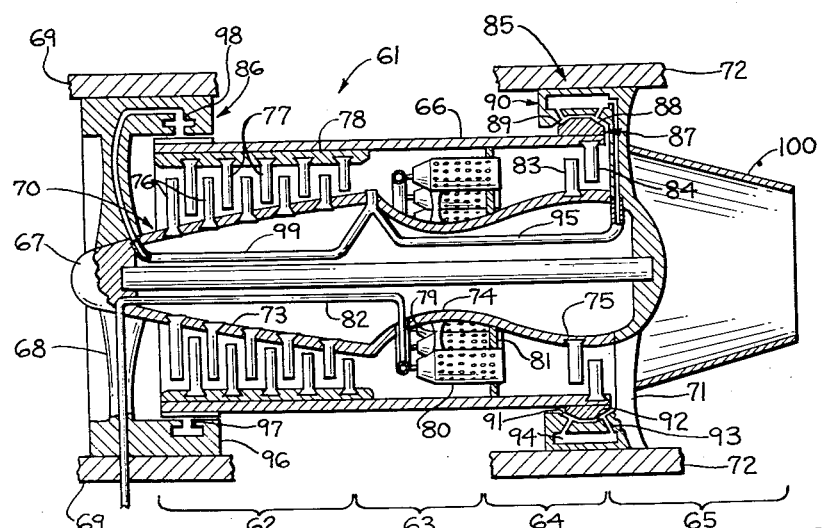
FIG. 9
INVENTORS
GAMES SLAYTER
BY ARTHUR A. FOWLE
Staelin & Overman
ATTORNEYS

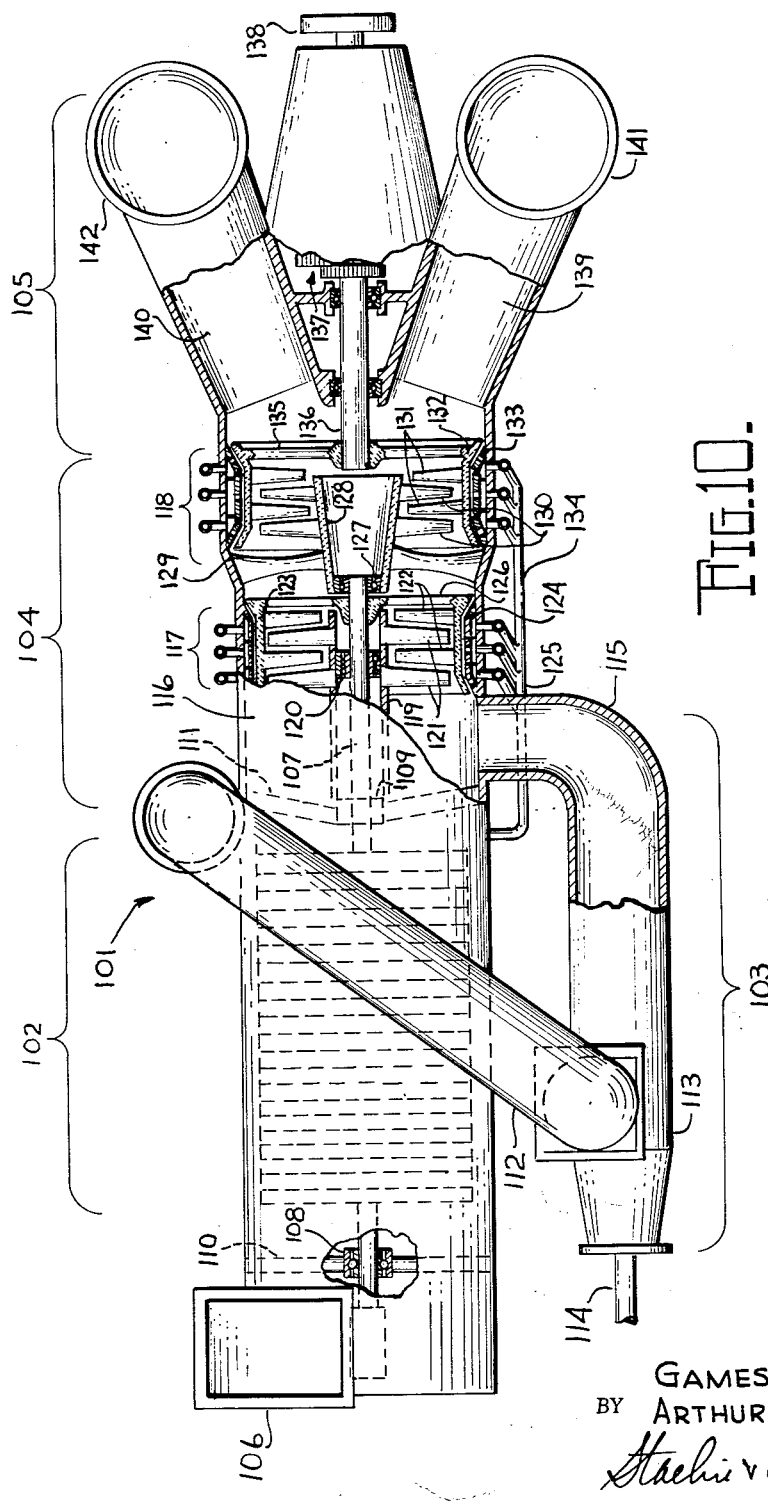

United States Patent Office 3,015,524
Patented Jan. 2, 1962

3,015,524
INVERTED TURBINE
Games Slayter, Newark, Ohio, and Arthur A. Fowle, Winchester, Mass., assignors, by direct and mesne assignments, to Owens-Corning Fiberglas Corporation, Toledo, Ohio, a corporation of Delaware
Filed Nov. 19, 1958, Ser. No. 774,973
4 Claims. (Cl. 308—9)

This invention relates to gas turbines and more particularly to turbines of a new design in which the rotating blades are maintained in compression.

In the normal operation of conventional turbine engines, air is successively compressed in a compression section, heated in a combustion section where a portion is mixed with fuel and ignited, and passed through a turbine section in which are blades that drive the compressor blades in the compression section through a direct drive. In the case of a jet engine, the gases are then axially exhausted to provide thrust for driving an aircraft which carries the engine. In a turbo-prop, or in a stationary turbine engine, additional blades are located beyond the blades for driving the compressor, the additional blades being used to convert the heat and pressure energy in the gases, developed in the compressor and combustor, into useful power through reduction gears connected to a power-take-off shaft.

The blade construction in the turbine section of a gas turbine engine is of prime consideration because these blades are subjected to high temperatures and large stresses. There are many known metal alloys used for such blades that will withstand temperatures of 2000–2200° F. or higher when subjected to little force or stress. However, because of the high rotational speed of the turbine rotor which produces large centrifugal forces in the blades, these alloys cannot withstand such forces for any length of time above a temperature of approximately 1600–1650° F. Consequently, the temperature of the entering gases to the turbine section are limited to a maximum of approximately 1650° F. If the burners in the combustion section employ sufficient air to maintain a stoichiometric proportion of air to fuel, then temperatures considerably above 1650° F. will be attained. Consequently, a large quantity of excess air must be employed to temper the heat and maintain the temperature of the combusted gases at 1650° F. or lower. Generally approximately 200–300% excess air is required, meaning two to three times the amount of air necessary for a stoichiometric air-fuel proportion. This excess air is compressed in the compressor section, along with the air necessary for combustion, and is subsequently passed through the turbine section along with the burned gases. More energy is expended in compressing the excess air than is subsequently obtained from expanding it. Therefore, the efficiency of the turbine is decreased and, at the same time, fuel costs are increased for a given power output, because more energy is required to drive the compressor than would be necessary without the excess air.

It has been estimated that if turbine blades could withstand a temperature of 2000° F., so that the turbine gases could be heated to 2000° F. rather than approximately 1650° F. or lower, the fuel cost of the turbine could be cut almost in half. This savings would be effected because the amount of excess air that must be compressed would be substantially decreased or eliminated. Fuel cost is of prime consideration in the operation of turbines because it constitutes approximately 90% of the cost of operation; consequently, it will be readily appreciated that such an increase in turbine gas temperatures would result in a tremendous saving in operating expenses. Higher operating temperatures also would enable the same horsepower to be obtained from a smaller, lighter engine or increased horsepower to be obtained from an engine of a given size. For example, a stationary turbine of a given size, operated with a given pressure ratio, will develop 80 horsepower at 1500° F. and 140 horsepower at 2000° F. A jet engine of a given size, operated with a given pressure ratio, will develop 70 horsepower at 1700° F. and 94 horsepower at 2500° F.

Various ceramics and cermets are well known that can withstand very high temperature, to 2800° F. and higher, and have been proposed for stationary turbine blades or nozzles. Ceramics and cermets would be totally unsuitable for use in rotating turbine blades, however, because the low tensile strength of such blades would cause them to quickly fly apart when subjected to the large centrifugal forces established by the high rotational speeds of the rotors of most turbines. There are no known blades that will withstand such forces in a gas turbine at high temperatures for any substantial length of time, and a reasonable life of these blades is essential because they are not only expensive but replacement is extremely time consuming and costly.

The present invention proposes a gas turbine employing ceramic or cermet blades, hereafter called ceramic type blades, which turbine overcomes the above disadvantages and limitations. These blades incorporated in a turbine designed according to the invention enable the turbine to be operated from 2000° F. to 2600° F. or higher and thus greatly decrease fuel cost and increase efficiency by greatly decreasing the amount of excess air required and, in some applications, eliminating substantially all of the previously required excess air. Thus, more or all air compressed in the compressor section is utilized in the combustion process to enable maximum efficiency to be obtained. Further, the blades have a long life because they are affixed to an annular rotor rather than a central rotor. The blades are affixed to the inner surface of the annular rotor and are thus placed in compresion rather than in tension, by the centrifugal force. Ceramic type blades have high strength in compression and thereby have a much longer useful life than if used in the conventional manner.

It is, therefore, a principal object of the invention to provide a gas turbine engine having higher efficiency.

Another object of the invention is to provide a gas turbine engine requiring less excess air in the combustion section.

A further object of the invention is to provide a gas turbine having lower fuel costs for a given power output.

Still another object of the invention is to provide a turbine section for a gas turbine engine that is capable of utilizing and withstanding gases heated to 2000° F. or higher.

Still a further object of the invention is to provide a gas turbine engine that can employ ceramic type turbine blades which have a long useful life.

Yet another object of the invention is to provide a gas turbine engine employing rotating blades that are maintained in compression.

Yet a further object of the invention is to provide a gas turbine engine in which the rotating blades are affixed to an annular rotor.

Other objects and advantages of the invention will be apparent from the following detailed description of a specific embodiment and modifications thereof, reference being made to the accompanying drawing, in which:

FIG. 2 is a view in cross section taken along line 2—2 of FIG. 1;

FIG. 3 is a view in perspective of a ceramic type blade employed with an annular rotor shown in FIGS. 1 and 2;

FIG. 4 is a view in cross section taken along line 4—4 of FIG. 1, showing members through which power is transmitted from an annular rotor shown in FIGS. 1 and 2;

FIG. 5 is a view in cross section taken along line 5—5 of FIG. 4;

FIG. 6 is a view in cross section taken along line 6—6 of FIG. 7 and showing a portion of an air bearing employed with the annular rotor;

FIG. 7 is a detailed view in cross section taken along line 7—7 of FIG. 6;

FIG. 8 is a view in perspective of a segment of the air bearing section shown in cross section in FIGS. 6 and 7;

FIG. 9 is a view in cross section of another form of jet engine embodying the principles of the invention;

FIG. 10 is a view of a stationary turbine engine, with parts broken away, embodying the principles of the invention; and FIG. 11 is a view in cross section of a modified turbine section of the jet engine shown in FIG. 1.

Figure 1:
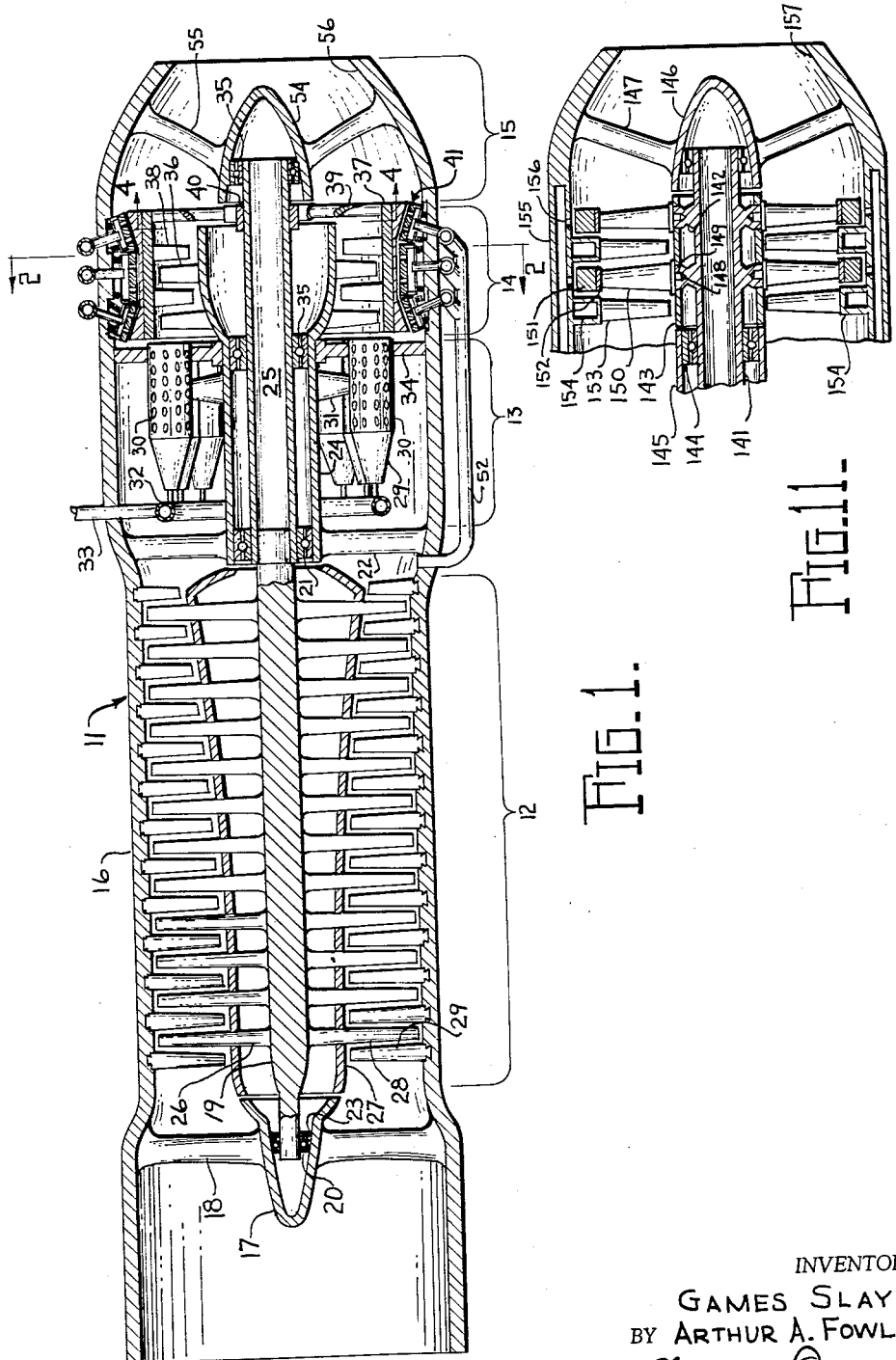
FIG. 1 is a view in cross section of a jet engine, as commonly used in jet aircraft, having a turbine section embodying the principles of the invention.

Referring particularly to FIG. 1, a jet engine generally indicated at 11 has a compressor section 12, a combustion section 13, a turbine section 14, and an exhaust section 15 which are enclosed in a suitable outer housing 16. A nose or inlet cone 17 is supported by a spider 18 that is attached to the outer housing 16 near the inlet of the compressor section 12. A solid compressor shaft 19 in the compressor section 12 is supported by suitable bearings 20 and 21 located near the front spider 18 and an intermediate spider 22. The front bearing 20 is held in a front support 23 connected to a portion of the inlet cone 17 and the rear bearing 21 is disposed between a stationary tubular core 24 and a hollow power transmitting shaft 25, in which the shaft 19 is affixed. Both the core 24 and the hollow shaft 25 extend through the combustion section 13 and into the turbine section 14. The shaft 19 has a plurality of spaced arms 26 that extend through, and are connected to, a rotating core 27 and carry rotating compressor blades 28. These are located in annular rows and extend between alternate rows of stator blades or vanes 29 attached to a portion of the outer housing 16 to form a conventional axial flow compressor. It will be understood, of course, that a radial or fixed flow compressor may be used with the turbine of the present invention.

A plurality of combustion chambers 30 of suitable, known design are disposed in an annular pattern in the combustion section 13 and are affixed to the stationary tubular core 24 by supports 31. Fuel is supplied to the combustion chambers 30 through a manifold ring 32 from a supply line 33 connected to a fuel pump and fuel supply tank (not shown). A rear support 34 is attached to the housing 16 near the outlet ends of the combustion chambers 30 and supports the chambers 30 and a portion of the core 24. The support 34 also is a dividing wall to prevent the air compressed in the compressor section 12 from bypassing the combustion chambers 30. Substantially all of the compressed air passes through scoops or ports in the walls of the chambers 30 except for a small portion that is used for cooling purposes. Up to this point, the gas turbine engine as described is of a substantially conventional design.

In accordance with the invention, bearings 35 support the hollow shaft 25 which extends through the turbine section 14. In this section, the core 24 in which the shaft 25 is located forms a hub for stationary turbine blades or vanes 36 (see FIGS. 2 and 3 also) which are employed in place of the central rotary blades of conventional turbines. An annular rotor 37 is spaced from the hub portion of the core 24 and carries rotor blades 38 that rotate therewith. A plurality of torque transmitting members 39 (also see FIGS. 4 and 5) connect the rotor 37 and a collar 40 affixed to an end of the hollow shaft 25. As shown in FIG. 4, the members 39 are positioned at an angle to a radius in the direction of rotation of both the annular rotor 37 and the hollow shaft 25. In this manner, the members 39 are maintained in compression as well as bending so as to more readily withstand bending and torsional stresses built up therein. As shown in FIG. 5, the members 39 can have a cross-sectional shape similar to a modified turbine blade to receive and transmit some force from the heated turbine gases substantially in the same manner as the blades 38.

The annular rotor 37 can be carried on air bearings 41, which have many advantages over conventional ball or roller bearings. No lubrication is required for air bearings and yet less film friction is produced. Further, the air of the air bearings tends to act as a cooling medium for the rotor 37. In addition, these bearings can withstand very high rotational and peripheral speeds without danger of overheating and failure. For the rotor 37, three of the air bearings 41 are preferably used in positions opposite the vanes 38 and the members 39, where rim stresses are greater because of the additional weight at these portions of the rotor. The pressure of the air in the bearings 41 also tends to offset the rim stresses and thereby reduce the stress in the rotor 37. The bearings at the ends of the rotor 37 are disposed at angles to counteract thrust acting on the turbine section.

FIGS. 2 and 6 show the middle one of the air bearings 41 in relation to the rotor 37. The bearing 41 comprises an inner ring 42 (see also FIG. 7) that is attached to the outer surface of the rotor 37, and an outer ring 43 supported by the inner surface of the housing 16, which outer ring includes a plurality of segments 44 slidably connected by means of a tongue and groove arrangement 45. A plurality of ports 46 and 47 are provided in annular rows in the outer ring 43. The ports 46 in the outside rows emit air substantially radially toward the ring 42 and the ports 47 in the middle row emit air obliquely toward a plurality of buckets 48 formed in the ring 42. The air from the ports 46 tends to support the rotor 37 and the air from the ports 47 both tends to support the rotor 37 and aids to some extent in driving it. Air is emitted through all ports from individual manifolds 49, one for each of the segments 44, which are supplied air from a supply line 50 connected to a ring manifold 51. Air can be supplied to this manifold 51 from a branch line 52 (FIG. 1) connected to the downstream end of the compressor section 12 or a separate compressor can be driven by the compressor shaft 19 if the air in the compressor section 12 is of insufficient pressure for a particular turbine to properly support the annular rotor 37.

When operating, the rotor 37 increases in diameter due to thermal expansion and dynamic growth and tends to decrease the .005–.025 inch clearance necessary between the inner and outer rings 42 and 43. To overcome this, the segments 44 have individual springs 53 that urge the sections inwardly. As the inner ring 42 and the annular rotor 37 expand, the pressure of the air between the rings 42 and 43 is increased and forces the segments 44 outwardly, thus maintaining the proper clearance between the rings 42 and 43. The outer ring 42 of the bearing 41 is still maintained air-tight between the segments 44, because of the tongue and groove connections 45 between the segments 44.

In operation, air enters the compressor section 12 and is compressed to, say, about 60 p.s.i. This air is then passed through the combustion chambers and heated to approximately 2000° F. when burned with fuel therein, except for a small amount of air that by-passes the chambers for cooling the rotor 37 and the hub portion of the core 24. The heated air and combustion gases are then passed through the turbine section 14 to drive the annular rotor 37 and the hollow shaft 25. Subsequently, the air and gases are exhausted between an exhaust cone 54 held by struts 55 and an exhaust nozzle 56.

The exhausted gases produce a high thrust force that moves the engine 11 forwardly. Since the rotating turbine blades are extended inwardly from the rotor 37, they are put under compression by the centrifugal forces of rotation. The blades, being strong in compression, can be operated at much higher temperatures than if they were stressed in tension as in conventional turbines.

Another form of jet engine suitable for use in aircraft and embodying the principles of the invention is shown in FIG. 9. The engine indicated at 61 includes a compressor section 62, a combustion section 63, a turbine section 64, and an exhaust section 65 which, except for the section 65, are enclosed by an annular rotor 66. A nose cone 67 is supported by struts 68 affixed to structural members 69 which can be a part of an aircraft in which the engine 61 is installed. A core 70, attached to the cone 67, extends through the rotor 66 beyond the turbine section 64 where the core is supported by struts 71 suitably attached to structural members 72 of the aircraft. The core 70 includes a flared compressor portion 73, a smaller combustion portion 74, and an enlarged turbine portion 75.

Several rows of stationary compressor blades or vanes 76 are suitably affixed to the compressor portion 73 of the core 70 with rows of rotating compressor blades 77 located therebetween which are affixed to a cylindrical ring 78 attached to the rotor 66. A spider 79 is attached to the combustion portion 74 of the core 70 and supports a plurality of combustion chambers 80, around the outlet ends of which is a dividing wall 81 for directing the air from the compressor section 62 through the combustion chambers 80 and also for supporting the chambers themselves. A small amount of air can flow around portions of the outer edges of the dividing wall 81 for cooling purposes. Fuel is supplied to the chambers 80 through a line 82 running through the core 70, the strut 68, and the member 69 and which is ultimately connected to a suitable pump and fuel supply source.

An annular row of stationary turbine blades or vanes 83 is located on the turbine portion 75 of the core 70 and coact with a row of rotary turbine blades 84 suitably affixed to the rotor 66. The hot gases from the combustion section 63 rotate the blades 84 which drive the blades 77 in the compressor section 62 directly through the rotor 66.

The rotor 66 is supported by two air bearings 85 and 86 located at or near the ends thereof. The bearing 85 includes a ring 87 attached to the rotor 66, which ring has two slanted surfaces 88 and 89 to withstand thrust acting on the rotor. An annular housing 90, supported by the structural members 72, has slanted surfaces 91 and 92 which are uniformly spaced from the slanted surfaces 88 and 89 of the ring 87. Annular rows of ports 93 are located in the housing 90 and are connected to an annular manifold 94 therein. Compressed air is supplied to the manifold from a line 95 which runs through the spider 71, through the core 70, and connects into the downstream end of the compressor section 62. Thus, the highly compressed air at the downstream end of the compressor section is transmitted to the manifold 94 to supply air for the bearing 85. The slanted surfaces 88 and 89 of the ring 85 can be provided with buckets similar to those shown in FIGS. 6 and 7 to aid in rotating the rotor 66, if desired.

The air bearing 86 includes an annular housing 96 having a row of ports 97 connected to a manifold 98. The manifold 98 is supplied with air by a line 99 which runs through the spider 68, through the core 70, and connects to the downstream end of the compressor section 62 to supply compressed air for the bearing 86. The bearing 86 serves simply to support the rotor 66 and allows the rotor to expand freely toward the inlet end of the engine 61 as the rotor is heated during operation. The ports 97 can be arranged radially or obliquely to help rotate the rotor 66 which can be provided with buckets, if desired.

In operation, air enters the compressor section 62 where it is compressed and passed through the combustion cans 80 where it can be heated to 2000° F. or higher. The heated air and combustion gases then pass through the turbine section 64 and drive the blades 84 and the rotor 66, which in turn directly drives the compressor blades 76. The air and gases are then exhausted through an exhaust nozzle 100 which is held by the structural members 72. Here again, the rotating turbine blades are in compression due to centrifugal force.

FIG. 10 shows a stationary turbine engine utilizing the principles of the invention. The stationary turbine engine, indicated at 101, includes a compressor section 102, a combustion section 103 which is set off to one side of the main portion of the engine, a turbine section 104, and an exhaust section 105. Air is drawn into the compressor section 102 through an inlet opening 106 where it is compressed by blades attached to a shaft 107 supported by bearings 108 and 109 in a spider 110 and a dividing wall 111. Air from the compressor section is exhausted through a duct 112 connected to a large combustor 113 in which the air is used to support combustion of a fuel emitted from a supply line 114. The hot products of combustion are then passed through a pipe 115 to an intermediate portion 116 of the turbine 101 behind the dividing wall 111.

The turbine section 104 comprises a compressor driving portion 117 and a shaft driving portion 118. The compressor driving portion 117 includes a tubular core 119 supported by the dividing wall 111 and by the shaft 107 through a bearing 120. Two rows of stationary blades or vanes 121 are attached to the core 119 and cooperate with two rows of rotating blades 122, which are driven by the hot products of combustion from the burner 113. The blades 122 are attached to an annular rotor 123 supported by an air bearing 124 which can be similar to the bearing 41, with air supplied from a line 125 connected into the downstream end of the compressor section 102. A plurality of torque transmitting members 126, similar to the members of the turbine 11, connect the rotor 123 to an extension of the shaft 107, the end of which is supported by a bearing 127 in a flared core 128 held by struts 129. Torque from the rotor 123 is transmitted through the members 126 to the shaft 107 and drives the rotating compressor blades in the section 102.

In a stationary turbine, the energy in the exhaust gases is used to drive a power take-off shaft rather than be exhausted through a nozzle and expended as thrust. Accordingly, the shaft driving portion 118 of the turbine 101 has rows of stationary blades 130 attached to the flared core 128 and which cooperate with rows of rotary blades 131 attached to an annular rotor 132 supported by air bearings 133 which can be similar to the bearing 124, with air supplied from a line 134, also connected to the downstream end of the compressor section 102. The rotor 132 has torque transmitting members 135 similar to the members 126 which are connected to a shaft 136 through which power is transmitted through a reducing gear train 137 to a power take-off shaft 138. Gases leaving the section 118 are exhausted through passages 139 and 140 to stacks 141 and 142 which remove these gases from any building in which the turbine engine 101 is housed, and which may contain suitable heat recuperating devices.

In operation, air is drawn through the inlet 106, the compressor section 103, passage 112, and into the combustion section 103. Here it is burned with fuel from the inlet 114, and the highly heated products of combustion are passed through the compressor driving section 117 to drive the blades 122, the rotor 123, the shaft 107, and the compressor blades in the section 102. The hot gases, only a small portion of the energy of which is expended in the compression driving section 117, are then passed through the shaft driving section 118, driving the blades 131, the rotor 132, the members 135, the shaft 136, the gear train 137, and the power take-off shaft 138. Energy is substantially exhausted from the gases which are removed through the exhaust passages and stacks. As in the previous forms of the invention, the rotor blades are under compression by the centrifugal forces and can thus be operated at higher temperatures than the same blades under tension.

The annular rotors utilized in turbines according to the invention can be coated on their inner surfaces, at least for those portions in the turbine sections, with a highly refractory coating to enable the rotors to better withstand the temperatures encountered. Such coatings in combination with the cooling effect of air in the air bearings enable the rotors to be maintained at considerably lower temperatures than the gases passing thereby and the ceramic containing blades associated therewith. The words "ceramic containing" are used to include both ceramic materials such as alumina, and sintered materials which comprise mixtures of metals and refractory metal oxides.

FIG. 11 shows a modified turbine design embodying the principles of the invention. This modification can be embodied in any of the previously discussed turbines but as shown is used in place of the turbine section 14 of the enigine 11 of FIG. 1. In this case, a shaft 141, which replaces the shaft 25, has two radially extending discs 142 to which is attached an annular core 143. The shaft 141 is supported by bearings 144 located in a stationary core 145, similar to the core 24, and in a tail cone 146 held by a spider 147. The tail cone and spider are similar to corresponding parts shown in FIG. 1.

The discs 142 have a plurality of recesses 148 into which extend anchoring pegs 149 of rotating blades 150. The blades 150 are affixed to heavy annular rotors 151 having ceramic coatings 152 on their inner surfaces for insulating purposes. The rotors 151 expand as they are rotated and heated, but the blades 150 remain affixed thereto because the blades are free to expand radially with respect to the discs 142. As the blades rotate, centrifugal force maintains them in compression against the rotors 151 in the same manner as occurs in the previous embodiments. Rows of stationary blades 153 are located in conventional positions, alternating with the rows of the blades 150, and are affixed to inwardly extending hollow members 154 attached to a housing 155. The housing 155 can be hollow with air supplied to it from the compressor section of the turbine or by means of air scoops. Ports 156 are provided near the rotors 151 through which the air can be emitted for cooling purposes. Air or other suitable coolant can also be supplied to the hollow members 154.

In operation, heated gases from the combustion section are supplied to the turbine section where they are directed by the stationary blades 153 toward the rotating blades 150. As the blades 150 rotate, they are maintained in compression against the rigid rotors 151 and at the same time rotate the discs 142 and the shaft 141 which drives compressor blades. The gases then pass out from an exhaust nozzle 157 of the turbine engine and the remaining energy therein is expended as thrust.

The basic form of the invention includes a turbine having an annular rotor to which inwardly extending blades, preferably containing a ceramic material, are affixed with the inner ends of the blades free to move radially. Means are provided for directing hot gases past the blades, and other means are provided for transmitting energy from the annular rotor.

Various modifications will be suggested from the above description and drawings, particularly where other types of turbines and different applications therefor are to be employed. It is understood that such modifications will not depart from the teachings of the present invention if within the scope of the depending claims.

What we claim is:

1. An air bearing for rotatably supporting a large rotor which is subjected to a wide variation in temperature, said air bearing comprising an inner annular ring attached to the outer surface of said rotor and disposed in a plane perpendicular to an axis thereof, a plurality of segments constituting an outer annular ring disposed around said inner ring and spaced therefrom, resilient means operatively associated with and effective yieldingly to urge each of said segments inwardly, and means for admitting air to the space between said rings.

2. An air bearing according to claim 1 wherein said air-admitting means includes separate yieldable means for supplying air through each of a plurality of the segments.

3. An air bearing according to claim 1 wherein said segments are urged by said resilient means from an expanded toward a normal position, and means effective to maintain substantially air-tight connections between said segments when in both normal and expanded positions.

4. An air bearing according to claim 1 characterized by a plurality of buckets formed around the inner ring on the outer surface thereof, and wherein said air-admitting means includes a plurality of ports extending through at least several of the outer segments for admitting air obliquely toward said buckets.

References Cited in the file of this patent

UNITED STATES PATENTS

| | | |
|---|---|---|
| 1,326,869 | Junggren | Dec. 30, 1919 |
| 1,460,353 | Williamson | June 26, 1923 |
| 2,360,130 | Heppner | Oct. 10, 1944 |
| 2,668,413 | Giliberty | Feb. 9, 1954 |
| 2,695,199 | Blizard | Nov. 23, 1954 |
| 2,704,645 | Colvin | Mar. 22, 1955 |
| 2,813,761 | Pilarczyk | Nov. 19, 1957 |

FOREIGN PATENTS

| | | |
|---|---|---|
| 14,180 | Great Britain | July 24, 1894 |
| 907,059 | France | June 11, 1945 |
| 57,013 | France | Aug. 6, 1952 |
| | (Addition of No. 997,219) | |
| 713,346 | Great Britain | Aug. 11, 1954 |
| 723,505 | Great Britain | Feb. 9, 1955 |
| 771,077 | Great Britain | Mar. 27, 1957 |